(12) United States Patent
Kudo et al.

(10) Patent No.: US 11,376,920 B2
(45) Date of Patent: Jul. 5, 2022

(54) MOVING BODY CONTROL APPARATUS

(71) Applicant: HONDA MOTOR CO., LTD., Tokyo (JP)

(72) Inventors: Seiji Kudo, Wako (JP); Masaki Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 436 days.

(21) Appl. No.: 16/739,345

(22) Filed: Jan. 10, 2020

(65) Prior Publication Data

US 2020/0231018 A1 Jul. 23, 2020

(30) Foreign Application Priority Data

Jan. 23, 2019 (JP) .............................. JP2019-009735

(51) Int. Cl.
| | | |
|---|---|---|
| *B60H 1/00* | (2006.01) | |
| *B60R 11/04* | (2006.01) | |
| *B60S 1/02* | (2006.01) | |
| *H04N 5/225* | (2006.01) | |
| *H04N 5/232* | (2006.01) | |
| *B60R 11/00* | (2006.01) | |

(52) U.S. Cl.
CPC .......... *B60H 1/00264* (2013.01); *B60R 11/04* (2013.01); *B60S 1/026* (2013.01); *H04N 5/22521* (2018.08); *H04N 5/23245* (2013.01); *B60H 2001/003* (2013.01); *B60R 2011/0026* (2013.01)

(58) Field of Classification Search
CPC ........... B06H 1/00264; H04N 5/22521; H04N 5/23245; B60R 11/04; B60R 2011/0026; B60S 1/026; B60H 2001/003
See application file for complete search history.

(56) References Cited

U.S. PATENT DOCUMENTS

| | | | |
|---|---|---|---|
| 10,351,073 | B2 | 7/2019 | Usami et al. |
| 10,899,359 | B2* | 1/2021 | Kim ........................ B60N 2/28 |
| 11,285,779 | B2* | 3/2022 | Kudo ..................... B60R 1/001 |
| 2012/0234930 | A1* | 9/2012 | Wijaya ..................... H04Q 9/00 |
| | | | 236/51 |

(Continued)

FOREIGN PATENT DOCUMENTS

JP 2017-206098 A 11/2017

*Primary Examiner* — Antoinette T Spinks
(74) *Attorney, Agent, or Firm* — Thomas | Horstemeyer, LLP

(57) ABSTRACT

There is provided with a moving body control apparatus. An image capturing unit captures a periphery of a moving body through a transmitting portion. A heater is capable of heating the transmitting portion. An air-conditioning unit switches an air-conditioning state in the moving body between an inside air circulation state and an outside air introduction state. A control unit controls the heater. An ambient temperature detection unit detects an ambient temperature. The control unit starts the operation of the heater when the ambient temperature is not more than a predetermined temperature threshold. The predetermined temperature threshold of the case in which the air-conditioning state is set to the inside air circulation state is higher than the predetermined temperature threshold in the case in which the air-conditioning state is set to the outside air introduction state.

5 Claims, 8 Drawing Sheets

(56) References Cited

U.S. PATENT DOCUMENTS

| | | | |
|---|---|---|---|
| 2012/0253573 A1* | 10/2012 | Shigyo | B60H 1/03 701/22 |
| 2014/0232868 A1* | 8/2014 | Schwarz | G02B 27/01 348/148 |
| 2016/0046174 A1* | 2/2016 | Sagou | H05B 3/12 219/202 |
| 2016/0059669 A1* | 3/2016 | Sagou | H05B 3/20 237/28 |
| 2017/0253201 A1* | 9/2017 | Maeshiro | B60H 1/00778 |
| 2017/0334364 A1 | 11/2017 | Usami et al. | |
| 2020/0086713 A1* | 3/2020 | Yamaguchi | B60H 1/00428 |
| 2020/0231021 A1* | 7/2020 | Kudo | B60S 1/0848 |
| 2020/0282804 A1* | 9/2020 | Tashiro | B60H 1/00785 |

\* cited by examiner

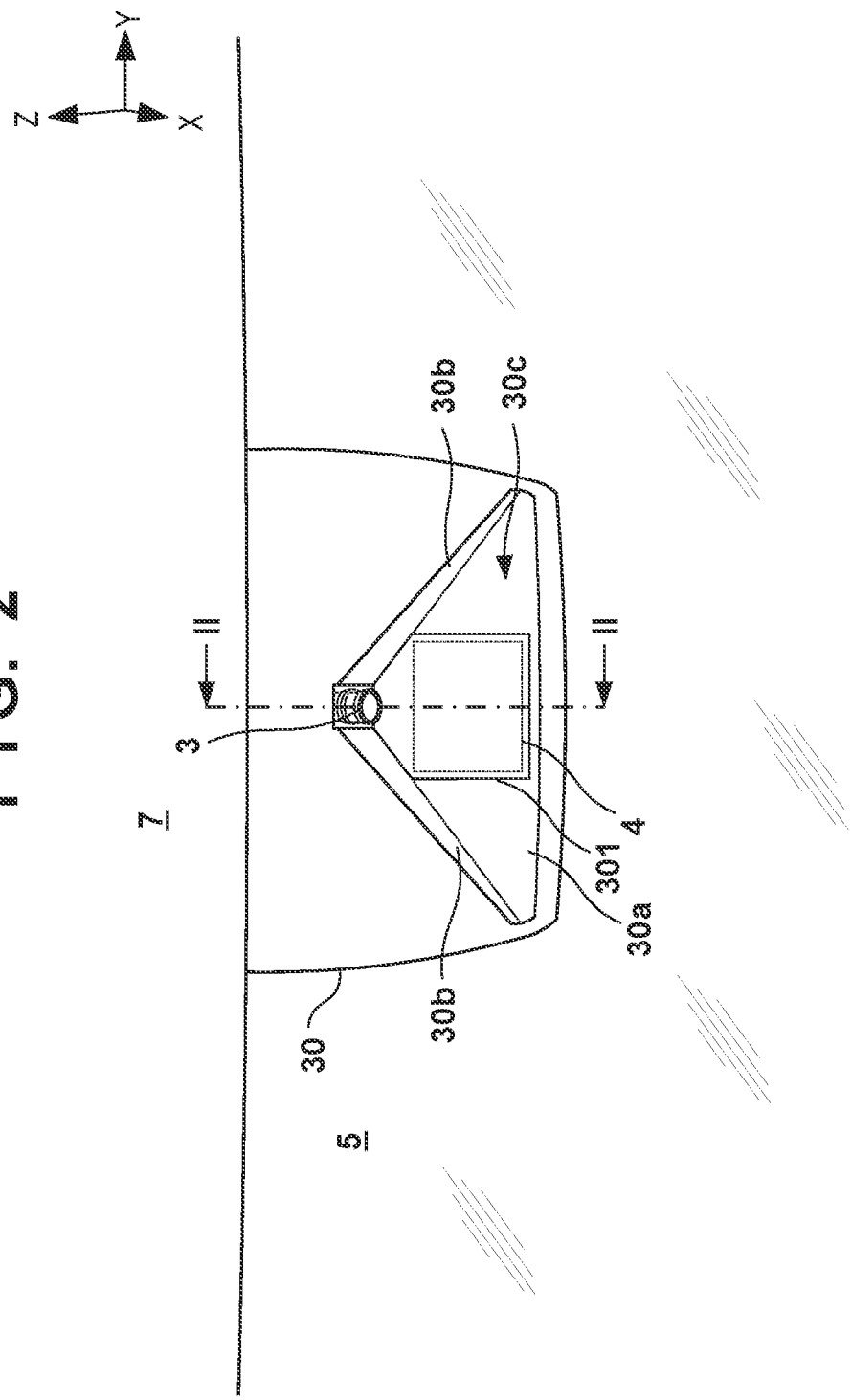

MOVING BODY CONTROL APPARATUS

CROSS-REFERENCE TO RELATED APPLICATION

This application claims priority to and the benefit of Japanese Patent Application No. 2019-009735 filed on Jan. 23, 2019, the entire disclosure of which is incorporated herein by reference.

BACKGROUND OF THE INVENTION

Field of the Invention

The present invention relates to a moving body control apparatus.

Description of the Related Art

There is known a vehicle in which a camera has been provided in the vehicle to capture the periphery of the vehicle. In such a vehicle, the camera captures the periphery of the vehicle through a portion of a window part. Japanese Patent Laid-Open No. 2017-206098 proposes a technique of arranging a heater to remove or prevent the fogging of a portion of a window part which falls within the field of view of the camera.

As an air-conditioning device incorporated in a moving body such as a vehicle or the like, there is an air-conditioning device that can switch the in-vehicle air-conditioning state between an inside air circulation state and an outside air introduction state. In the case of the inside air circulation state, the humidity inside the vehicle tends to increase more easily than in the outside air introduction state. As a result, the fogging of the portion of the window part which falls within the field of view of the camera will occur more frequently.

SUMMARY OF THE INVENTION

An embodiment of the present invention provides to more effectively remove or prevent fogging of a portion of a window part which falls within a field of view of an image capturing apparatus.

According to one embodiment of the present invention, a moving body control apparatus comprises: an image capturing unit configured to capture a periphery of a moving body through a transmitting portion which forms a window part of the moving body; a heater configured to be capable of heating the transmitting portion; an air-conditioning unit configured to switch an air-conditioning state in the moving body between an inside air circulation state and an outside air introduction state; a control unit configured to control the heater; and an ambient temperature detection unit configured to detect an ambient temperature, wherein the control unit performs control in which a condition related to the ambient temperature for starting an operation of the heater differs between a case in which the air-conditioning state is set to the inside air circulation state and a case in which the air-conditioning state is set to the outside air introduction state, and starts the operation of the heater when the ambient temperature is not more than a predetermined temperature threshold, and the predetermined temperature threshold of the case in which the air-conditioning state is set to the inside air circulation state is higher than the predetermined temperature threshold in the case in which the air-conditioning state is set to the outside air introduction state.

According to another embodiment of the present invention, a moving body control apparatus comprises: an image capturing unit configured to capture a periphery of a moving body through a transmitting portion which forms a window part of the moving body; a heater configured to be capable of heating the transmitting portion; an air-conditioning unit configured to switch an air-conditioning state in the moving body between an inside air circulation state and an outside air introduction state; a control unit configured to control the heater; and an ambient temperature detection unit configured to detect an ambient temperature, wherein the control unit performs control in which a condition related to the ambient temperature for starting an operation of the heater differs between a case in which the air-conditioning state is set to the inside air circulation state and a case in which the air-conditioning state is set to the outside air introduction state, and starts the operation of the heater when a change amount of the ambient temperature per predetermined time is not less than a predetermined threshold, and the predetermined threshold of the case in which the air-conditioning state is set to the inside air circulation state is smaller than the predetermined threshold in the case in which the air-conditioning state is set to the outside air introduction state.

Further features of the present invention will become apparent from the following description of exemplary embodiments (with reference to the attached drawings).

BRIEF DESCRIPTION OF THE DRAWINGS

FIG. 2 is a view in which an image capturing apparatus and a heater are seen from the outside of a window part according to the embodiment;

DESCRIPTION OF THE EMBODIMENTS

Figure 1A:
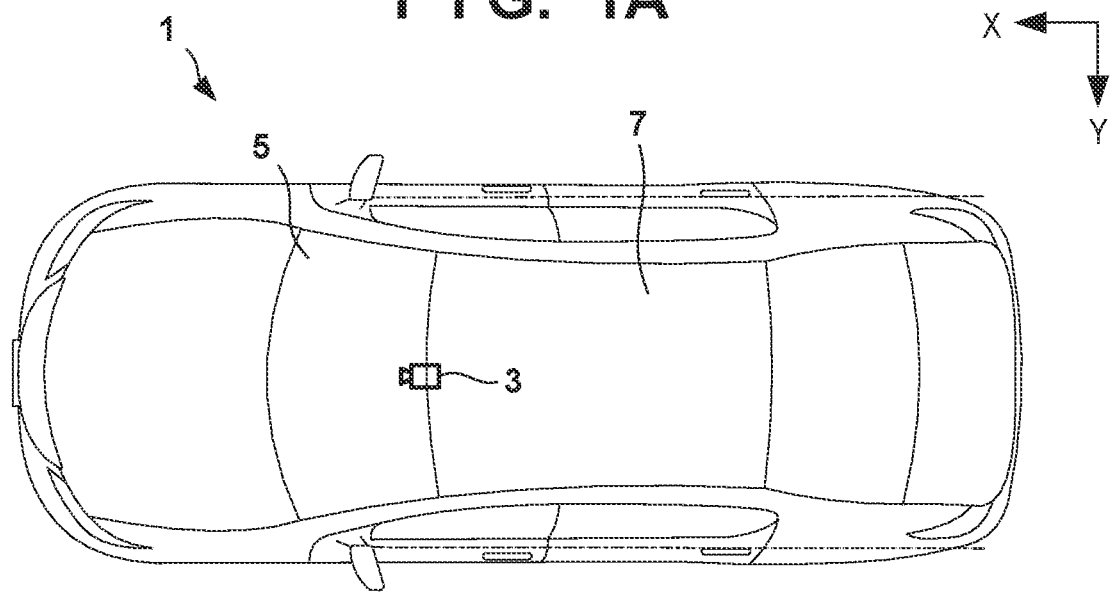
FIG. 1A is a plan view of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Arrangement of Vehicle Control Apparatus>

Figure 1B:
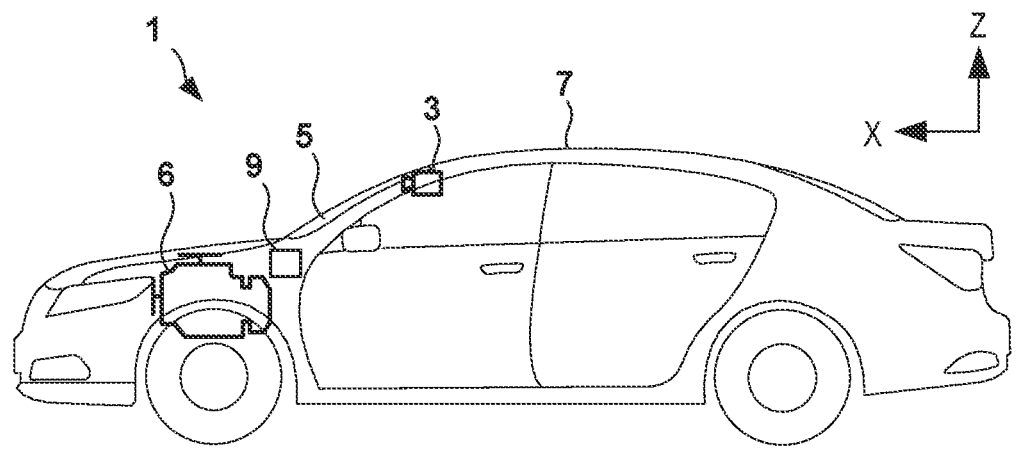
FIG. 1B is a side view of the vehicle according to the embodiment.

A vehicle control apparatus 20 according to the first embodiment will be described below. FIGS. 1A and 1B are a plan view and a side view, respectively, of a vehicle 1 according to an embodiment. Note that in each drawing, an arrow X indicates the front-and-rear direction of the vehicle 1, and an arrow Y indicates the vehicle width direction of the vehicle 1. An arrow Z indicates the vertical direction.

The vehicle 1 is, for example, a sedan-type four-wheeled vehicle. The vehicle 1 includes two seats in the front row adjacent to a window part 5, and two seats in the rear row. The right seat in the front row is the driver's seat, and the left seat is the passenger seat. The vehicle 1 includes a total of four doors adjacent to the seats. A driving unit 6 is provided in the front part of the vehicle 1. The driving unit 6 includes a driving source that generates the driving force of the vehicle 1. In this embodiment, the driving source is an engine (internal combustion engine). The driving unit 6 includes an automatic transmission in addition to the engine. Note that another driving source such as an electric motor or the like may be adopted as the driving source or the driving source may be formed by a combination of a plurality of devices such as a combination of an internal combustion engine and an electric motor. Also, although a four-wheeled vehicle will be exemplified in this description, the present invention is applicable to another moving body such as a motorcycle, a ship, or the like.

An air-conditioning device 9 that performs air-conditioning inside the vehicle is provided in the front part of the vehicle 1. The air-conditioning device 9 will perform cooling, heating, dehumidification, ventilation, or the like based on the operation of an occupant. The operation of the occupant is made on, for example, a switch (not shown) arranged on a dashboard inside the vehicle. The air-conditioning device 9 can also switch the in-vehicle air-conditioning state between an inside air circulation state and an outside air introduction state. In this embodiment, the air-conditioning device 9 has, as its operation modes, an inside air circulation mode and an outside air introduction mode. The air-conditioning device 9 will make the air circulate inside the vehicle when the inside air circulation mode is set and will supply air from the outside of the vehicle to the inside of vehicle when the outside air introduction mode is set.

Figure 3:
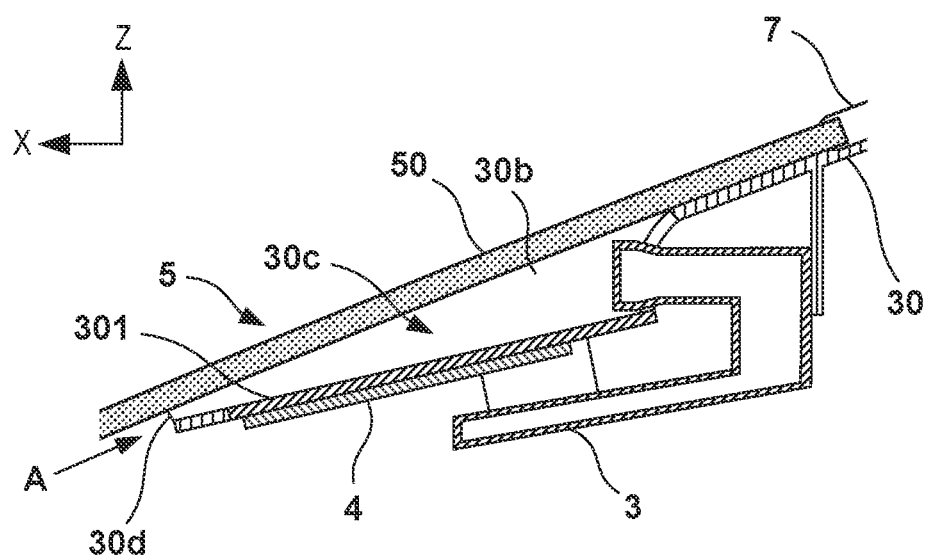
FIG. 3 is a sectional view taken along a line II-II of FIG. 2.

FIGS. 2 and 3 will be referred to together. FIG. 2 is a view in which an image capturing apparatus 3 and a heater 4 have been seen from the outside of the window part 5. FIG. 3 is a sectional view taken along a line II-II of FIG. 2.

The vehicle 1 includes the image capturing apparatus 3 that captures the periphery of the vehicle 1. In this embodiment, the image capturing apparatus 3 captures an image of the front of the vehicle 1. The image capturing apparatus 3 is, for example, a camera that includes an image sensing element such as an image sensor or the like and an optical system such as a lens or the like. In this embodiment, an image captured by the image capturing apparatus 3 is used for, for example, detecting an obstacle in the front of the vehicle 1, recognizing a road division line (for example, a white line), and the like.

Also, in this embodiment, the image capturing apparatus 3 is arranged, via a bracket 30, at the front part of a roof 7 on the interior side of the vehicle 1. The image capturing apparatus 3 also can capture the front of the vehicle 1 through a transmitting portion 50 forming the window part 5. When viewed from the direction of FIG. 2, the lens portion of the image capturing apparatus 3 is exposed, and the main body portion of the image capturing apparatus 3 is hidden behind or below the bracket 30 and the heater 4.

The heater 4, which is capable of heating the transmitting portion 50, is arranged below the transmitting portion 50. In this embodiment, the heater 4 is adhered to the back side of an SLS (stray light suppression structure) 301. The SLS 301 is a plate-like member used to suppress the scattered reflection of light that has entered the vehicle through the transmitting portion 50. The front side of the SLS 301 is arranged so as to face the transmitting portion 50, and the heater 4 is adhered to the back side of the SLS. That is, in this embodiment, the heater 4 is arranged on the bracket 30 via the SLS 301.

The heater 4 is a device for removing or preventing the fogging of the transmitting portion 50. For example, if heating is used in the vehicle when the ambient temperature is low, fogging due to condensation on the window glass or the like of the vehicle may occur because of the increase in the difference between the ambient temperature outside the vehicle and the temperature inside vehicle. In addition, for example, fogging of the window glass or the like may also occur due to ice or frost which may attach to the outer surface of the vehicle when the ambient temperature is low. If the transmitting portion 50 becomes foggy, an image captured by the image capturing apparatus 3 will become unclear, and the captured image may not be able to be used to detect an obstacle, a division line, or the like during a travel support operation. Hence, in this embodiment, the fogging of the transmitting portion 50 is removed or prevented by arranging the heater 4 for the image capturing apparatus 3.

The heater 4 is, for example, an electric heater. In this embodiment, the heater 4 has a plate-like shape and can heat its periphery when a current flows in an electric line arranged in a plate-like portion. Note that the arrangement of the heater 4 is merely an example, and it is possible to adopt another arrangement. For example, an electric line may be arranged around the transmitting portion 50 of the window part 5 itself.

The bracket 30 supports the image capturing apparatus 3 and the heater 4. The bracket 30 includes a wall portion 30a, which is arranged to face the transmitting portion 50, and wall portions 30b, which are arranged to extend from the wall portion 30a to the direction of the transmitting portion 50. In this embodiment, a space 30c is delimited by the transmitting portion 50, the wall portion 30a, and the wall portions 30b. Note that the arrangement of the bracket 30, the wall portion 30a, and the wall portions 30b is merely an example and may be changed appropriately.

In addition, in this embodiment, a communication portion 30d which makes the space 30c and the rest of the space inside the vehicle communicate is formed on the front side of the wall portion 30a. In other words, a gap is formed between the front end of the wall portion 30a and the window part 5 (the transmitting portion 50). This kind of an arrangement allows air from the air-conditioning device 9, which is provided at the front part of the vehicle 1, to be introduced to the space 30c along the window part 5 in the manner shown by an arrow Ain FIG. 3. That is, the communication portion 30d is arranged so that the air from the air-conditioning device 9 can be introduced to the space 30c. Since this kind of an arrangement will allow the air from the air-conditioning device 9 to directly hit the transmitting portion 50, the fogging of the transmitting portion 50 can be removed or prevented more effectively.

Note that although the bracket 30 which supports the image capturing apparatus 3 and the heater 4 is arranged on the roof 7 in this embodiment, it is possible to adopt an arrangement in which the bracket 30 is adhered to the window part 5. Also, although only one image capturing apparatus 3 has been provided in this embodiment, it is also possible to arrange two or more image capturing apparatuses 3, arrange the heater 4 in correspondence with each provided image capturing apparatus, and adopt an arrangement in which these components are supported by a bracket or brackets. Note that in a case in which a plurality of image capturing apparatuses 3 and heaters 4 are to be arranged, a plurality of brackets may be arranged so that each bracket will support each paired image capturing apparatus 3 and heater 4. Alternatively, it may be arranged so that a single bracket will support the plurality of image capturing apparatuses 3 and heaters 4.

Figure 4:
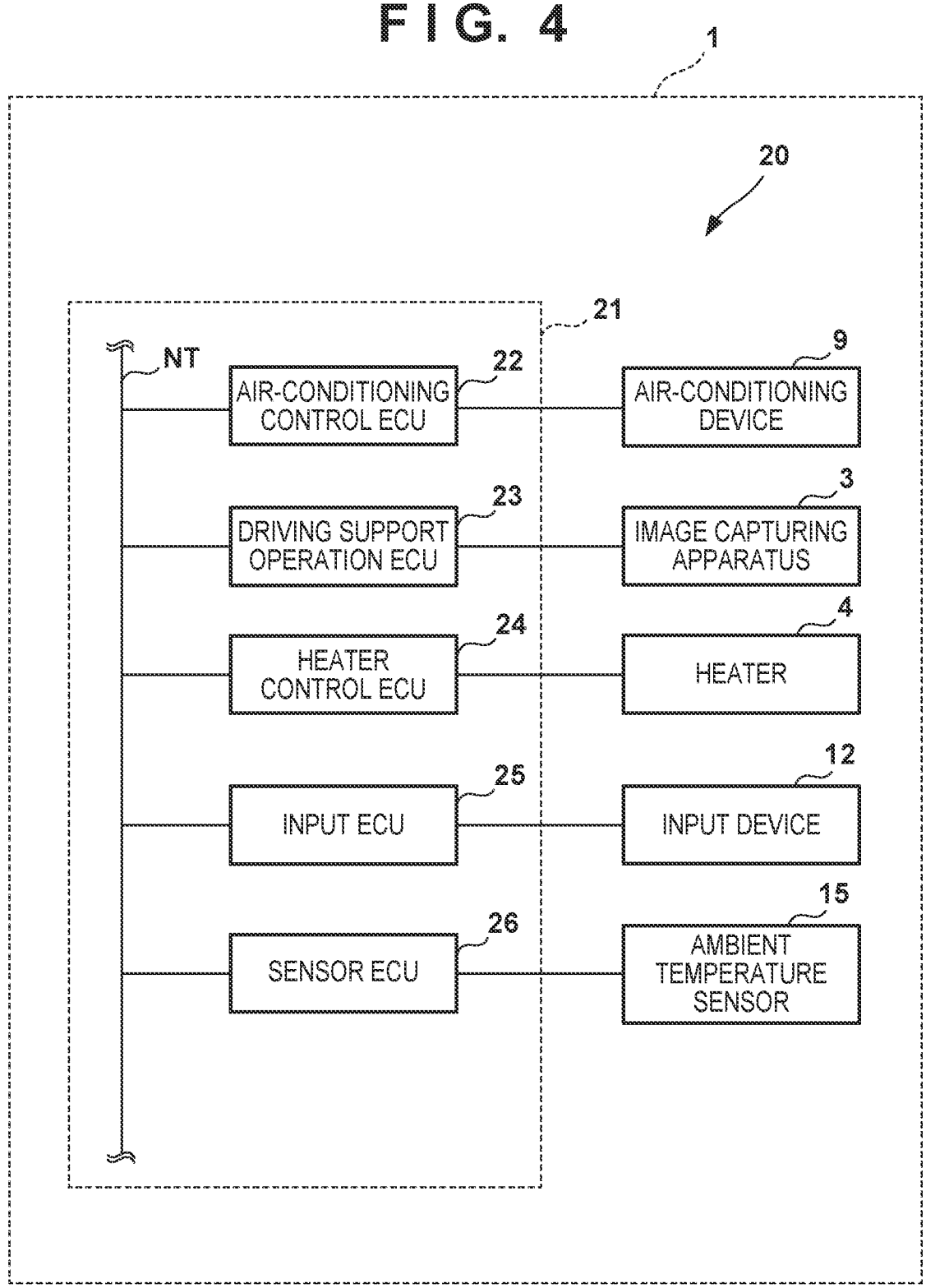
FIG. 4 is a block diagram shown an example of the arrangement of a vehicle control apparatus according to the embodiment.

FIG. 4 is a block diagram showing an example of the arrangement of the vehicle control apparatus 20 of the vehicle 1. The vehicle control apparatus 20 is a unit that controls the devices of the vehicle 1, and FIG. 4 shows an arrangement required in relation to the features of the embodiment to be described later.

The vehicle control apparatus 20 includes a control unit 21. The control unit 21 includes a plurality of ECUs (Electric Control Units) 22 to 26. The ECUs are communicably connected to each other via an in-vehicle network. Each ECU includes a processor represented by a CPU, a storage device such as a semiconductor memory or the like, an interface with an external device, and the like. The storage device stores programs to be executed by the processor, data to be used for processing by the processor, and the like. Each ECU may include a plurality of processors, storage devices, interfaces, and the like. Note that the number of ECUs and their respective functions can be designed appropriately, and the ECUs may be more subdivided or integrated than this embodiment. Note that the ECUs 22 to 26 are denoted by their representative functional names in FIG. 4. For example, the ECU 22 is described as an "air-conditioning control ECU".

The ECU 22 controls the operation of the air-conditioning device 9. For example, the ECU 22 controls the operation and suspension of the air-conditioning device 9, the switching between cooling and heating, and the switching between the inside air circulation mode and the outside air introduction mode. These control processes are performed based on, for example, an in-vehicle state such as the in-vehicle temperature or the like and an operation made by an occupant and accepted by the ECU 25 (the input ECU). The ECU 23 performs a travel support operation (in other words, a driving support operation) as a travel control operation of the vehicle 1 based on the detection results obtained by the image capturing apparatus 3 and other detection units (not shown). The ECU 24 controls the operation of the heater 4. For example, the ECU 24 executes control related to the operation of the heater 4 such as adjusting the output from the heater 4, switching between ON/OFF, and the like. For example, the ECU 24 controls the operation of the heater 4 in accordance with the procedure of the flowchart to be described later in FIG. 5. The ECU 25 accepts an instruction made on an input device 12 by an occupant. For example, the input device 12 includes an ignition switch for starting the driving unit 6 and switches for instructing the switch between ON/OFF of the air-conditioning device 9, between cooling and heating, and between the inside air circulation mode and the outside air introduction mode. In addition, the ECU 26 controls a sensor 15 and obtains the detection result of this sensor. In relation to the following explanation, the sensor 15 includes an ambient temperature sensor (to be referred to as the ambient temperature sensor 15 hereinafter) that detects the ambient temperature.

<Processing Example of Control Unit>

Figure 5:
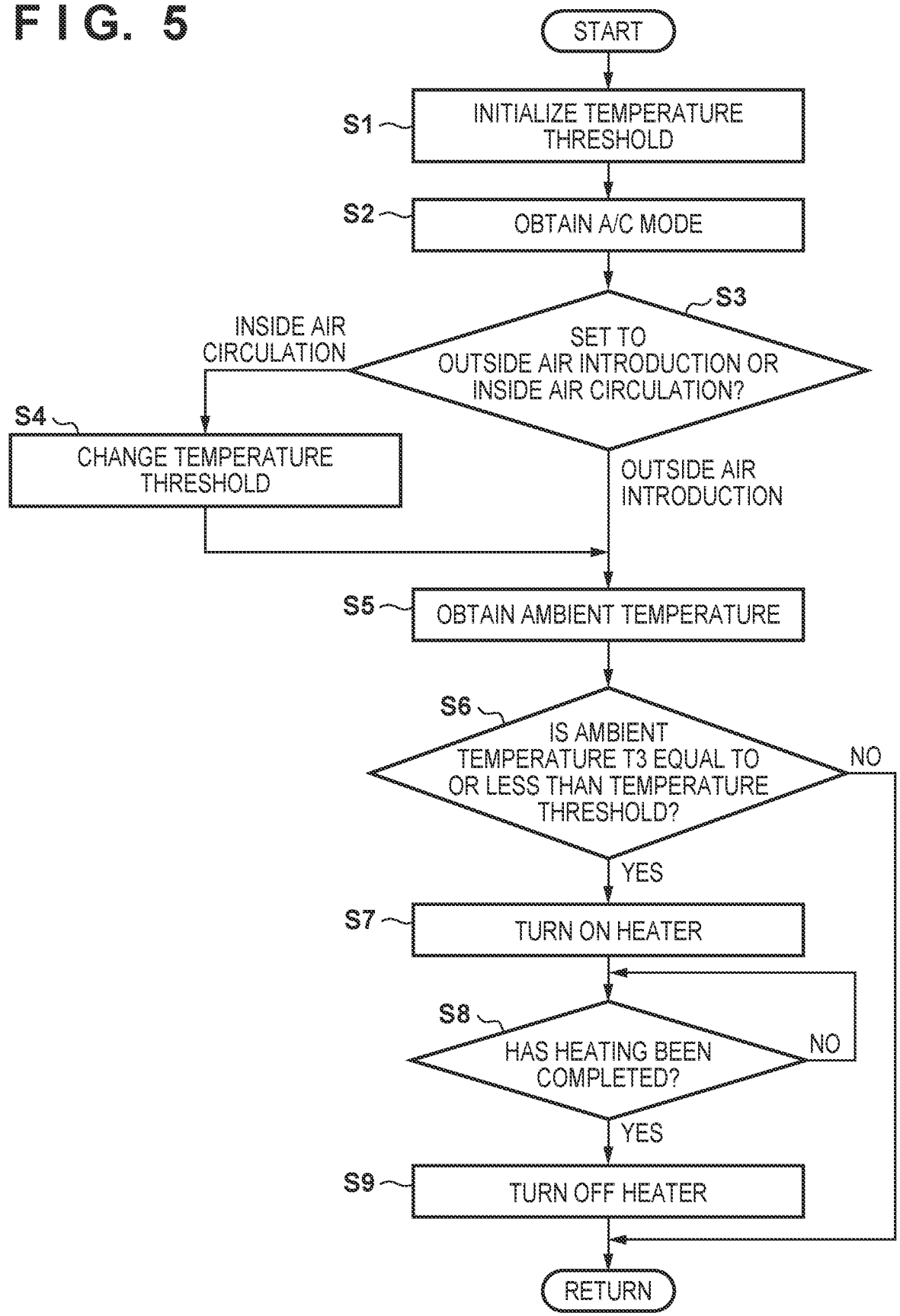
FIG. 5 is a flowchart showing an example of processing performed when the heater is in operation according to the embodiment.

A processing example of the control unit 21 will be described. FIG. 5 is a flowchart showing an example of the processing performed when the heater 4 executed by the ECU 24 (the heater control ECU) is in operation. Note that the processing of this flowchart starts when the air-conditioning device 9 starts (A/C is turned on) to operate.

As described above, if heating is used in the vehicle when the ambient temperature is low, fogging due to condensation on the window glass or the like of the vehicle may occur because of the increase in the difference between the ambient temperature and the internal temperature of the vehicle. Furthermore, this fogging will occur more easily as the humidity inside the vehicle increases. On the other hand, in a case in which the air-conditioning device 9 can switch the in-vehicle air-conditioning state between an inside air circulation state and an outside air introduction state, the humidity inside the vehicle tends to increase more easily when the air-conditioning state is set to the inside air circulation state than when it is set to the outside air introduction state. Hence, when the air-conditioning device 9 is in operation, fogging will occur more easily in the inside air circulation state than in the outside air introduction state.

Thus, in this embodiment, fogging is removed or prevented more effectively by performing different control processes on the heater 4 in the inside air circulation state and the outside air introduction state. In this embodiment, a condition related to ambient air which set to operate the heater 4 is made to differ between the inside air circulation state and the outside air introduction state. That is, in this embodiment, the ECU 24 will start the operation of the heater 4 when the ambient temperature is equal to or less than a predetermined threshold. The ECU 24 will perform control so that the predetermined temperature threshold will be different for the inside air circulation state and the outside air introduction state. In this embodiment, when T1 is the temperature threshold to be in the outside air introduction state and T2 is the temperature threshold to be set in the inside air circulation state, the thresholds will be set to T1<T2. As a result, since the operation of the heater 4 will be started more easily in the inside air circulation state in which fogging of the transmitting portion 50 is more likely to occur, it becomes possible to remove or prevent the fogging of the transmitting portion more effectively. Note that the temperature thresholds T1 and T2 can be changed appropriately in accordance with the arrangement of the vehicle 1, the use area, or the like. For example, the temperature thresholds T1 and T2 can be set to 10° C. and 15° C., respectively, or can be set to be higher or lower than these temperatures.

In FIG. 5, in step S1, the ECU 24 initializes the temperature threshold. In this embodiment, the temperature threshold T1 set when the in-vehicle air-conditioning state is in the outside air introduction state will be set as the initial value. Hence, the ECU 24 sets the temperature threshold to T1. Note that it is possible to adopt an arrangement in which the temperature threshold T2 set when the in-vehicle air-conditioning state is in the inside air circulation state is set as the initial value.

In step S2, the ECU 24 obtains the operation information of the air-conditioning device 9 from the ECU 22. In step S3, the ECU 24 determines, based on the operation information obtained in step S2, whether the air-conditioning device 9 is set to the inside air circulation mode or the outside air introduction mode. If the air-conditioning device 9 is set to the inside air circulation mode, the ECU 24 makes the process advance to step S4. If the air-conditioning device is set to the outside air introduction mode, the process advances to step S5.

In step S4, the ECU 24 changes the temperature threshold which is used to start the operation of the heater 4. In this embodiment, the ECU 24 sets the temperature threshold to be T2 (>T1). As a result, since the temperature threshold of the inside air circulation mode will be set higher than that of the outside air introduction mode, the operation of the heater 4 will be started more easily in the inside air circulation mode in which the humidity tends to increase more easily. Thus, the fogging of the transmitting portion 50 can be removed or prevented more effectively.

In step S5, the ECU 24 obtains, from the ECU 26, the ambient temperature (to be referred to as an ambient temperature T3) detected by the ambient temperature sensor 15. In step S6, the ECU 24 determines whether the ambient temperature T3 is equal to or less than the temperature threshold. If the ambient temperature T3 is higher than the temperature threshold (T3 >T1 or T2), the ECU 24 ends the first operation of the processing. On the other hand, if the ambient temperature is equal to or less than the temperature threshold (T3 <T1 or T2), the ECU 24 makes the process advance to step S7.

In step S7, the ECU 24 starts (turns on) the operation of the heater 4, and the process advances to step S8. In step S8, the ECU 24 determines whether heating of the transmitting portion 50 by the heater 4 has been completed. If the heating by the heater 4 has been completed, the ECU 24 will make the process advance to step S9. Otherwise, the ECU 24 repeats the determination of step S8 until the operation is completed. In this embodiment, it will be determined that the heating has been completed when the heater 4 has operated for a predetermined time. Also, in this embodiment, if the ambient air becomes equal to or higher than predetermined temperature while the heater 4 is in operation, it will also be determined that heating by the heater 4 has been completed because the transmitting portion need not be heated to a temperature higher than that. The determination conditions described above can be changed appropriately. For example, the ECU 24 may determine that heating by the heater 4 has been completed if the heater 4 has operated for 15 minutes or if the ambient air has become equal to or higher than 10° C. In addition, the same condition may be used to make the above-described determination in the outside air introduction state and the inside air circulation state or different conditions may be used. For example, the predetermined time set to determine the completion of the heating by the heater 4 may be set to be longer in the inside air circulation state than the outside air introduction state. In step S9, the ECU 24 ends (turns off) the operation of the heater 4, and the processing ends.

According to the processing described above, the ECU 24 performs control so that the ambient temperature threshold, which is set for the heater to operate, will change between a case in which the in-vehicle air-conditioning state is set to the inside air circulation state and a case in which the in-vehicle air-conditioning state is set to the outside air introduction state. Since the heater will be operated at a higher ambient temperature when the air-conditioning state is set to the inside air circulation state, in which fogging is more likely to occur, it becomes possible to remove or prevent fogging of the transmitting portion more effectively.

Second Embodiment

The operation of a heater 4 is started when the ambient temperature is equal to or less than a predetermined temperature in the first embodiment. However, the second embodiment differs from the first embodiment in the point that the operation of the heater is started when a change amount ΔT3 of an ambient temperature T3 per predetermined time is equal to or more than a predetermined threshold. Note that in this embodiment, the change amount ΔT3 is positive when the ambient temperature has decreased after a predetermined time has elapsed. That is, the change amount ΔT3 is the amount of reduction of the ambient temperature T3 per predetermined time, and the operation of the heater is started when this amount of reduction is equal to or more than a predetermined value.

For example, in a case in which the vehicle enters a tunnel or a sudden rainfall occurs while a driving operation is being performed, a window part 5 may become fogged due to the sudden temperature change even if the ambient temperature is comparatively high. Also, even in such cases, fogging tends to occur more easily when the inside air circulation state is set than when the outside air introduction state is set. Thus, in the second embodiment, the operation of the heater 4 will be started when the change amount ΔT3 of the ambient temperature T3 per predetermined time is equal to or more than the predetermined threshold. Particularly, in this embodiment, the operation of the heater 4 will be started when the change amount ΔT3 per predetermined time is equal to or more than the predetermined threshold. In addition, in the case of the inside air circulation state in which fogging is more likely to occur, the predetermined threshold is made small compared to that in the case of the outside air introduction state. That is, in the inside air circulation state, the fogging of the window part 5 (a transmitting portion 50) can be removed or prevented more effectively by starting the operation of the heater 4 even if the amount of the reduction of the ambient temperature is small compared to the outside air introduction state.

Figure 6:
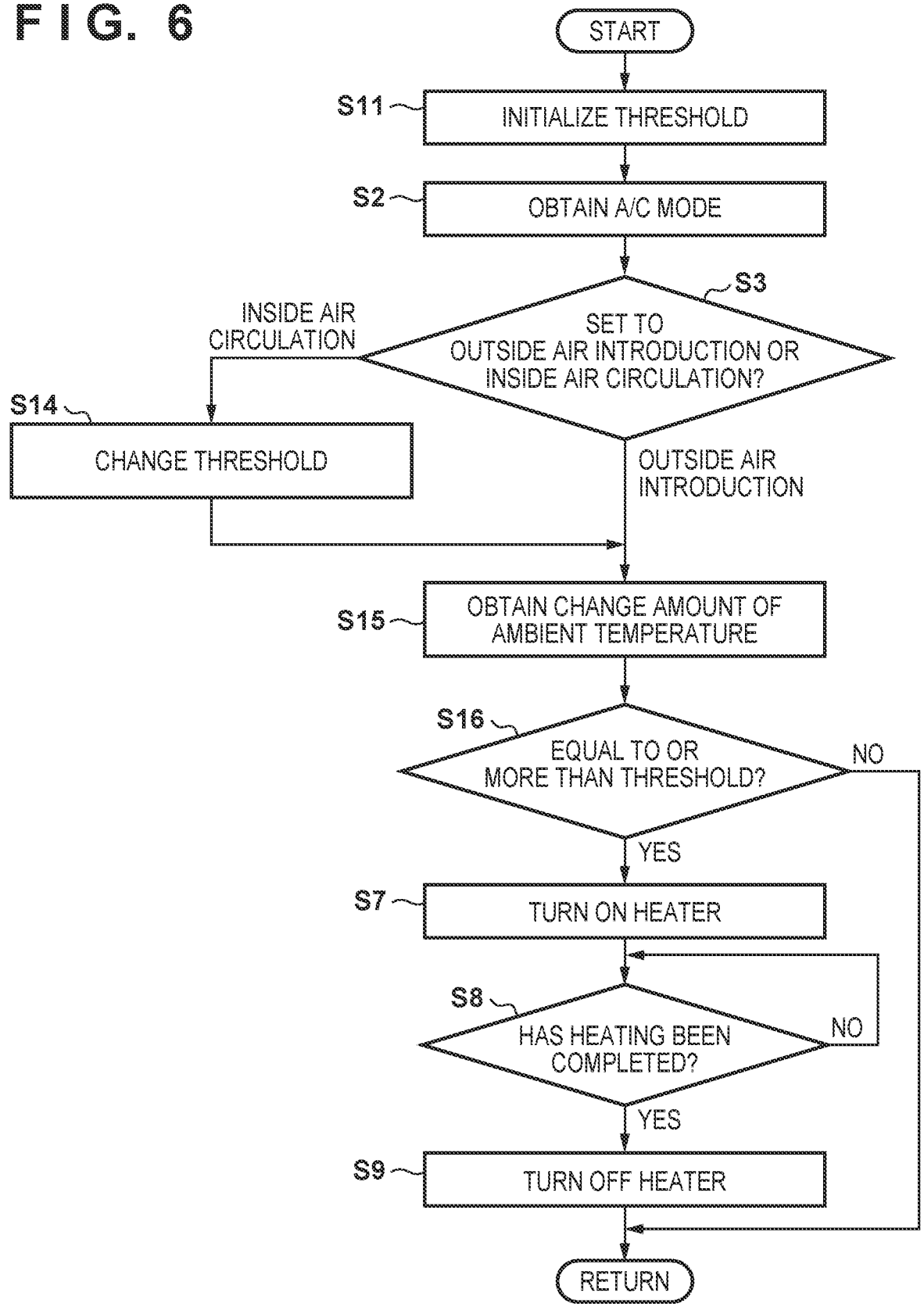
FIG. 6 is a flowchart showing an example of processing performed when a heater is in operation according to another embodiment.

FIG. 6 is a flowchart showing an example of the processing performed when the heater 4 executed by an ECU 24 is in operation according to the second embodiment. The same reference symbols denote processes which are the same as those in the first embodiment, and a description may be omitted hereinafter.

In step S11, the ECU 24 initializes the threshold. In this embodiment, a temperature change threshold ΔT1 when the in-vehicle air-conditioning state is set to the outside air introduction state is used as the initial value. Hence, the ECU 24 will set the threshold as ΔT1. Note that an arrangement in which a threshold ΔT2 is set as the initial value when the in-vehicle air-conditioning state is set to the inside air circulation state can also be adopted. Also, the temperature change thresholds ΔT1 and ΔT2 can be changed appropriately. For example, the temperature thresholds ΔT1 and ΔT2 can be set to 10° C./30 sec and 5° C./30 sec, respectively, or can be set to be higher or lower than these thresholds.

In step S14, the ECU 24 changes the threshold which is used to start the operation of the heater 4. In this embodiment, the ECU 24 sets the threshold to ΔT2 (<ΔT1). Since the threshold is set smaller in the inside air circulation mode than in the outside air introduction mode, the operation of the heater 4 can be started more easily when the air-conditioning state is set to the inside air circulation mode in which the humidity tends to increase more easily, and it becomes possible to remove or prevent the fogging of the transmitting portion 50 more effectively.

In step S15, the ECU 24 obtains, from an ECU 26, the ambient temperature T3 detected by an ambient temperature sensor 15, and calculates the change amount. In this embodiment, since the amount of reduction of the ambient temperature is used as a determination condition, the ECU 24 obtains the ambient temperature before and after a predetermined time has elapsed. Although the predetermined time at which the reduction amount of the ambient temperature is checked can be set appropriately, the predetermined time can be set to, for example, 30 sec or set to a time longer or shorter than this. The ECU 24 calculates the change amount ΔT3 of the ambient temperature from the ambient temperature T3 obtained before the predetermined time has elapsed and on the ambient temperature T3 obtained after the predetermined time has elapsed.

In step S16, the ECU 24 determines whether the change amount ΔT3 is equal to or more than the threshold. If the change amount ΔT3 of the ambient temperature T3 is smaller than the predetermined threshold (ΔT3 <ΔT1 or ΔT2), the ECU 24 ends the first operation of the processing. On the other hand, if the change amount is equal to or more than the threshold (ΔT3 >ΔT1 or ΔT2), the ECU 24 makes the process advance to step S7.

As described above, according to this embodiment, since the operation of the heater 4 is started at a smaller amount of reduction of the ambient air in the inside air circulation state than in the outside air introduction state, the fogging of the window part 5 (the transmitting portion 50) can be removed or prevented more effectively.

Third Embodiment

Although different conditions for starting the operation of a heater 4 are set between the inside air circulation state and the outside air introduction state in the first and second embodiments, it is also possible to adopt an arrangement in which the operation condition, which is set while the heater 4 is in operation, differs between the inside air circulation state and the outside air introduction state. In the third embodiment, the output at the time of the heater operation is made higher in the inside air circulation state than that in the outside air introduction state so that fogging of a window part 5 (a transmitting portion 50) can be removed or prevented more effectively when the in-vehicle air-conditioning state is set to the inside air circulation state in which the fogging of the window part 5 (the transmitting portion 50) is more likely to occur.

Figure 7:
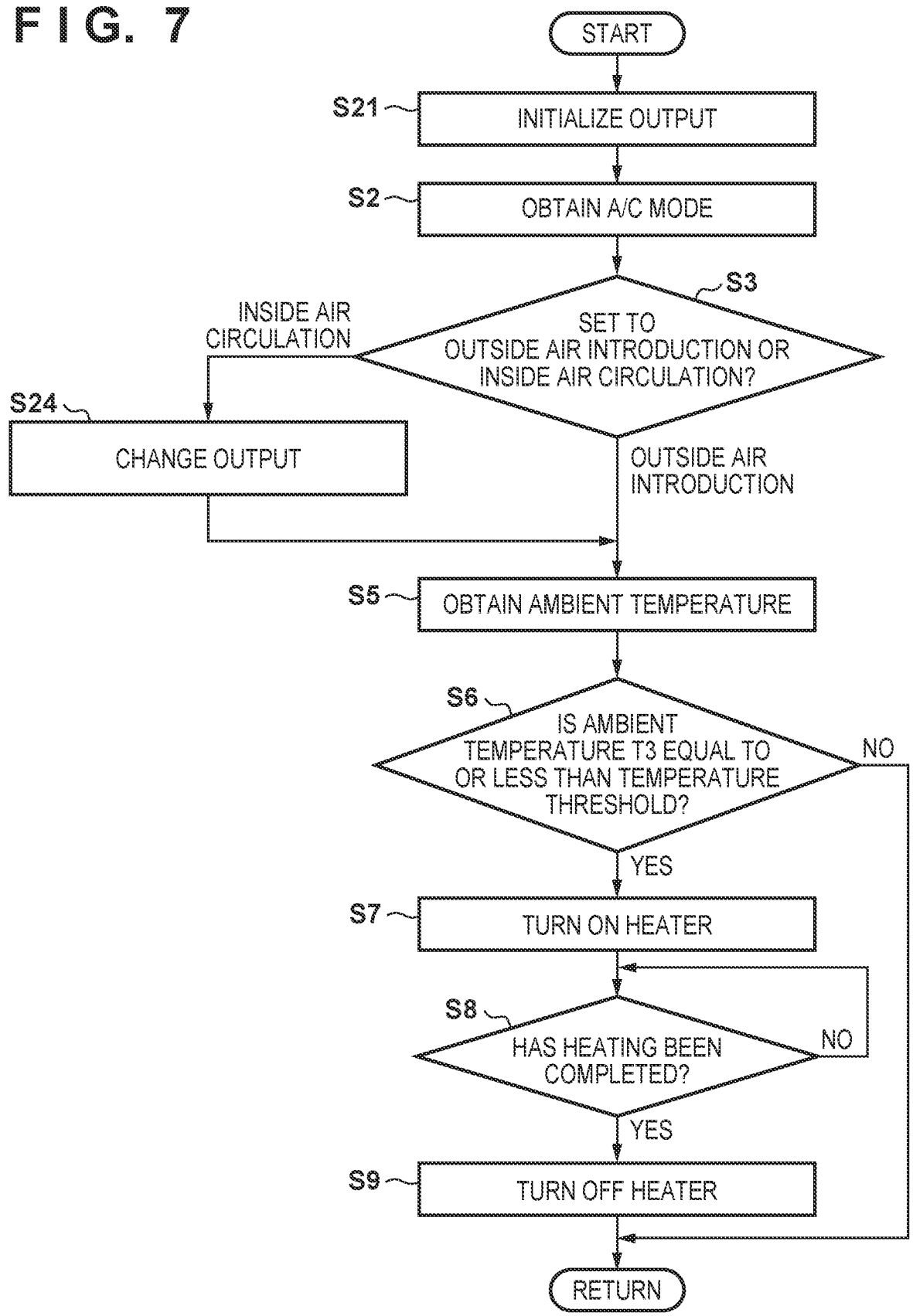
FIG. 7 is a flowchart showing an example of processing performed when a heater is in operation according to yet another embodiment.

FIG. 7 is a flowchart showing an example of processing executed by an ECU 24 when the heater 4 is in operation according to the third embodiment. The same reference symbols denote processes which are the same as those in the first embodiment, and a description may be omitted hereinafter.

In step S21, the ECU 24 initializes the heater output value. In this embodiment, a heater output P1 when the in-vehicle air-conditioning state is set to the outside air introduction state is set as the initial value. Hence, the ECU 24 sets the heater output P1 as the initial value. Note that it is possible to adopt an arrangement in which a heater output P2 when the in-vehicle air-conditioning state is in the inside air circulation state is set as the initial value.

In step S24, the ECU 24 changes the output of the heater 4. In this embodiment, the heater output is changed to P2 (>P1). As a result, since the heater output in the inside air circulation mode will be set higher than in the outside air introduction mode and the output of the heater 4 will increase in the inside air circulation mode in which the humidity tends to increase more easily, it becomes possible to remove or prevent the fogging of the transmitting portion 50 more effectively.

Fourth Embodiment

The fourth embodiment is similar to the third embodiment in that the operation condition, which is set while the heater 4 is in operation, differs between the inside air circulation state and the outside air introduction state. However, in the fourth embodiment, the heater 4 can operate intermittently, and the operation of the heater 4 is controlled so that the operation interval condition will differ between the inside air circulation state and the outside air introduction state.

The heater 4 may be operated intermittently by repeatedly turning on/off the heater 4 in some cases from the point of view of preventing the over-heating of a transmitting portion 50, reducing energy consumption, or the like. In this embodiment, control is performed so that a heater ON time and a heater OFF time (to be referred to as an intermittent operation time hereinafter) of the heater 4 during the intermittent operation will differ between the inside air circulation state and the outside air introduction state. That is, control is performed so that the intermittence interval will differ between the inside air circulation state and the outside air introduction state. As a result, the fogging of a window part 5 (the transmitting portion 50) can be suppressed more effectively.

Figure 8:
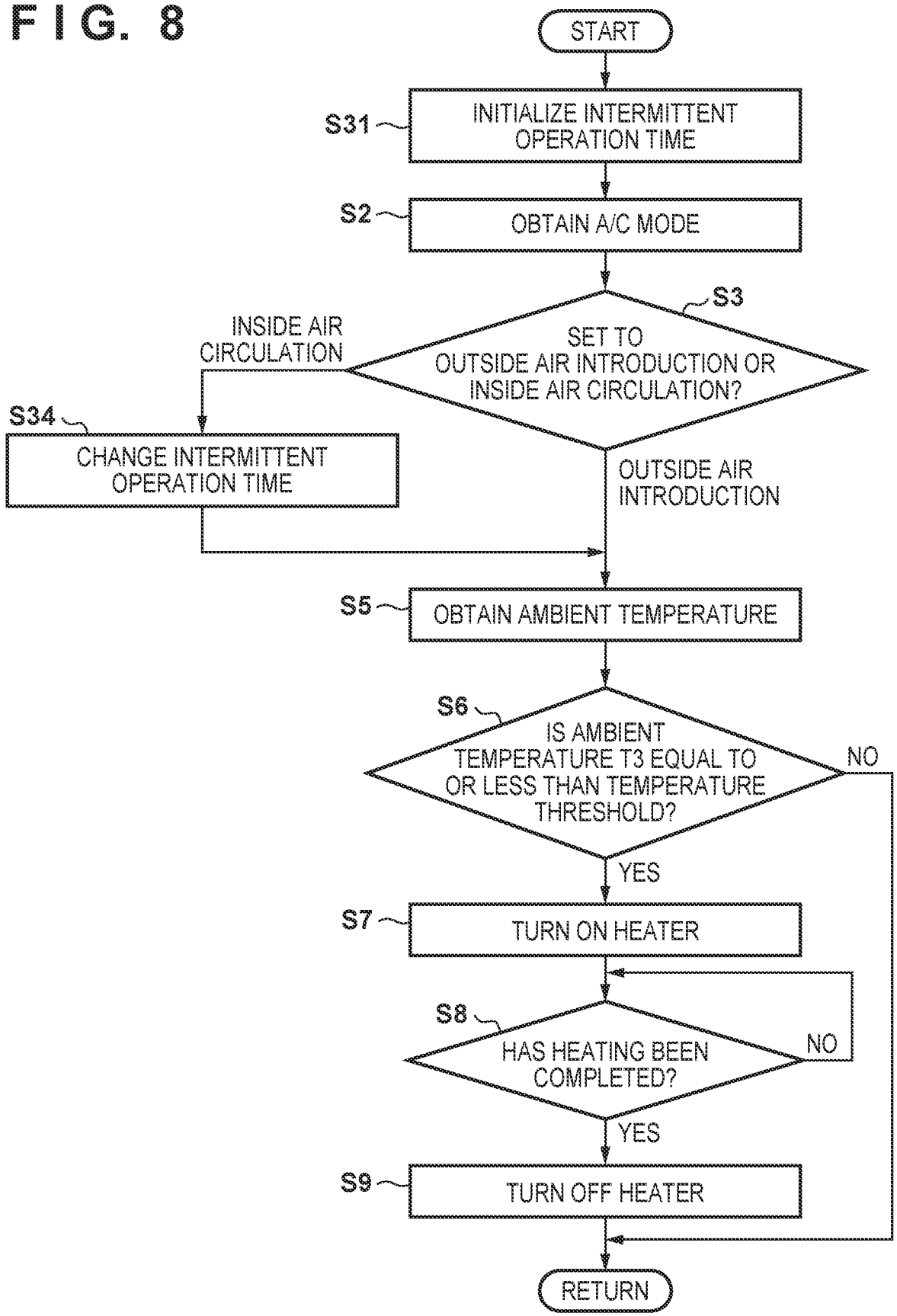
FIG. 8 is a flowchart showing an example of processing performed when a heater is in operation according to yet another embodiment.

FIG. 8 is a flowchart showing an example of processing executed by an ECU 24 when the heater 4 is in operation according to the fourth embodiment. The same reference symbols denote processes which are the same as those in the first embodiment, and a description may be omitted hereinafter.

In step S31, the ECU 24 initializes the heater intermittent operation time. In this embodiment, a heater intermittent operation time X1 when the in-vehicle air-conditioning state is set to the outside air introduction state is set as the initial value. Hence, the ECU 24 will set the heater intermittent operation time to X1. Note that it is possible to adopt an arrangement in which the initial value is set to be a heater intermittent operation time X2 when the in-vehicle air-conditioning state is set to the inside air circulation state.

In step S34, the ECU 24 changes the heater intermittent operation time of the heater 4. In this embodiment, the heater intermittent operation time is changed to X2. In this embodiment, X2 is set to have a higher ratio of the heater ON time with respect to the heater OFF time than X1. The heater ON time and the heater OFF time of each of X1 and X2 may be set appropriately. However, for example, it is possible to make settings so that, while the heater ON time and the heater OFF time are both set to 15 min in the case of X1, the heater ON time will be set to 15 min and the heater OFF time will be set to 5 min in the case of X2. In this manner, by making settings so that the ratio of the heater ON time during the intermittent operation will be relatively higher in the inside air circulation state than in the outside air introduction state, it becomes possible to suppress the fogging of the transmitting portion 50 more effectively. In addition, by making settings so that the ratio of the heater OFF time will be relatively higher in the outside air introduction state in which the fogging of the transmitting portion 50 is comparatively less likely to occur, it becomes possible to suppress the energy consumption of the operation of the heater 4.

In addition, as the intermittent time setting, it may be set so that ON/OFF will be switched at a shorter interval in the case of X2. For example, the heater ON time and the heater OFF time both may be set to 15 min in the case of X1, but the heater ON time and the heater OFF time both may be set to 5 min in the case of X2. Since this will suppress the decrease in the temperature of the transmitting portion 50 when the heater is set to OFF, it becomes possible suppress the fogging of the transmitting portion 50 more effectively.

Furthermore, in this embodiment, the determination performed in step S8 to determine whether heating has been completed may be performed based on, other than a determination based on the elapse of a predetermined time or the ambient temperature as described above, whether the switching of the ON/OFF of the heater has been performed for a predetermined number of times.

<Other Embodiments>

The control processes according to the first embodiment to the fourth embodiment can be combined appropriately. For example, the first and second embodiments are control processes for starting the operation of the heater, and the third and fourth embodiments are control processes for the heater in operation. Therefore, one of the first and second embodiments and one of the third and fourth embodiments may be combined. As a result, it will become possible to remove or prevent fogging more effectively at the start of and during the operation of the heater.

<Summary of Embodiments>

The above-described embodiments disclose at least the following moving body control apparatus.

1. A moving body control apparatus (for example, 20) according to the above-described embodiment comprises image capturing unit (for example, 3) configured to capture a periphery of a moving body (for example, 1) through a transmitting portion (for example, 50) which forms a window part (for example, 5) of the moving body, a heater (for example, 4) configured to be capable of heating the transmitting portion, air-conditioning unit (for example, 9) configured to switch an air-conditioning state in the moving body between an inside air circulation state and an outside air introduction state, control unit (for example, 24) configured to control the heater, and ambient temperature detection unit (for example, 15) configured to detect an ambient temperature, wherein the control unit performs control in which a condition related to the ambient temperature for starting an operation of the heater differs between a case in which the air-conditioning state is set to the inside air circulation state and a case in which the air-conditioning state is set to the outside air introduction state, and starts the operation of the heater when the ambient temperature is not more than a predetermined temperature threshold, and the predetermined temperature threshold of the case in which the air-conditioning state is set to the inside air circulation state is higher than the predetermined temperature threshold in the case in which the air-conditioning state is set to the outside air introduction state.

According to this embodiment, since the control condition of the heater will differ between a case in which the air-conditioning state is set to the inside air circulation state and a case in which the air-conditioning state is set to the outside air introduction state, the heater can be controlled in accordance with how easily the window part can become fogged. Hence, the fogging of the window part that falls within the field of view of the image capturing apparatus, that is, the fogging of the transmitting portion can be removed or prevented more effectively. In addition, according to this embodiment, since the condition related to the ambient temperature for starting the operation of the heater will differ between the case in which the air-conditioning state is set to the inside air circulation state and the case in which the air-conditioning state is set to the outside air introduction state, control can be performed so that the start of the heater operation will differ in accordance with how easily the window part can become fogged. Hence, the fogging of the transmitting portion can be removed or controlled more effectively. Furthermore, according to this embodiment, the threshold of the ambient temperature for starting the operation of the heater is set higher in the case in which the air-conditioning state is set to the inside air circulation state than the case in which the air-conditioning state is set to the outside air introduction state. Hence, since the heater will operate more easily when the air-conditioning state is set to the inside air circulation state, in which the humidity inside the vehicle tends to increase and the fogging of the window part which falls within the field of view of the image capturing apparatus tends to occur more easily compared to the outside air introduction state, the fogging of the transmitting portion can be removed or prevented more effectively.

2. A moving body control apparatus (for example, 20) according to the above-described embodiment comprises image capturing unit (for example, 3) configured to capture a periphery of a moving body (for example, 1) through a transmitting portion (for example, 50) which forms a window part (for example, 5) of the moving body, a heater (for example, 4) configured to be capable of heating the transmitting portion, air-conditioning unit (for example, 9) configured to switch an air-conditioning state in the moving body between an inside air circulation state and an outside air introduction state, control unit (for example, 24) configured to control the heater, and ambient temperature detection unit (for example, 15) configured to detect an ambient temperature, wherein the control unit starts the operation of the heater when a change amount of the ambient temperature per predetermined time is not less than a predetermined threshold, and the predetermined threshold of the case in which the air-conditioning state is set to the inside air circulation state is smaller than the predetermined threshold in the case in which the air-conditioning state is set to the outside air introduction state.

According to this embodiment, the threshold of the change amount of the ambient air for starting the operation of the heater is higher in the case in which the air-conditioning state is set to the inside air circulation state than in the case in which the air-conditioning state is set to the outside air introduction state. Hence, since the heater will operate more easily when the air-conditioning state is set to the inside air circulation state, in which the humidity inside the vehicle tends to increase and the fogging of the window part which falls within the field of view of the image capturing apparatus tends to occur more easily compared to the outside air introduction state, the fogging of the transmitting portion can be removed or prevented more effectively.

3. In the moving body control apparatus according to the above-described embodiment, the control unit performs control in which a condition during the operation of the heater differs between the case in which the air-conditioning state is set to the inside air circulation state and the case in which the air-conditioning state is set to the outside air introduction state, and makes an output from the heater during the operation higher in the case in which the air-conditioning state is set to the inside air circulation state than in the case in which the air-conditioning state is set to the outside air introduction state.

According to this embodiment, since the condition of the heater during the operation will differ between a case in which the air-conditioning state is set to the inside air circulation state and a case in which the air-conditioning state is set to the outside air introduction state, the heater can be controlled in accordance with how easily the window part can become fogged. Hence, the fogging of the transmitting portion can be removed or prevented more effectively. In addition, according to this embodiment, the output from the heater will increase in the case in which the air-conditioning state is set to the inside air circulation state in which the humidity in the vehicle tends to increase and the fogging of the window part tends to occur more easily. Hence, the fogging of the transmitting portion can be removed or prevented more effectively.

4. In the moving body control apparatus according to the above-described embodiment, the control unit performs control in which a condition during the operation of the heater differs between the case in which the air-conditioning state is set to the inside air circulation state and the case in which the air-conditioning state is set to the outside air introduction state, and can make the heater operate intermittently and perform control so that an operation interval of the heater will be shorter in the case in which the air-conditioning state is set to the inside air circulation state than in the case in which the air-conditioning state is set to the outside air introduction state.

According to this embodiment, the interval of intermittence of the heater during the intermittent operation differs between the case in which the air-conditioning state is set to the inside air circulation state and the case in which the air-conditioning state is set to the outside air introduction state. Hence, since different control will be performed in accordance with how easily the window part will become fogged, the fogging of the transmitting portion can be removed or prevented more effectively.

5. The moving body control apparatus according to the above-described embodiment further comprises a bracket (for example, 30) configured to support the image capturing unit and the heater, wherein the bracket includes wall portions (for example, 30*a* and 30*b*), the wall portions and the transmitting portion delimit a space (for example, 30*c*), and a communication portion (for example, 30*d*) through which air from the air-conditioning unit can be introduced to the space is provided in the wall portion.

According to this embodiment, since the air from the air-conditioning device will pass through the communication portion, introduced to the space, and directly hit the transmitting portion, the fogging of the transmitting portion can be removed or prevented more effectively.

The invention is not limited to the foregoing embodiments, and various variations/changes are possible within the spirit of the invention.

What is claimed is:

1. A moving body control apparatus comprising:
an image capturing unit configured to capture a periphery of a moving body through a transmitting portion which forms a window part of the moving body;
a heater configured to be capable of heating the transmitting portion;
an air-conditioning unit configured to switch an air-conditioning state in the moving body between an inside air circulation state and an outside air introduction state;
a control unit configured to control the heater; and
an ambient temperature detection unit configured to detect an ambient temperature,
wherein the control unit
performs control in which a condition related to the ambient temperature for starting an operation of the heater differs between a case in which the air-conditioning state is set to the inside air circulation state and a case in which the air-conditioning state is set to the outside air introduction state, and
starts the operation of the heater when the ambient temperature is not more than a predetermined temperature threshold, and
the predetermined temperature threshold of the case in which the air-conditioning state is set to the inside air circulation state is higher than the predetermined temperature threshold in the case in which the air-conditioning state is set to the outside air introduction state.

2. A moving body control apparatus comprising:
an image capturing unit configured to capture a periphery of a moving body through a transmitting portion which forms a window part of the moving body;
a heater configured to be capable of heating the transmitting portion;
an air-conditioning unit configured to switch an air-conditioning state in the moving body between an inside air circulation state and an outside air introduction state;
a control unit configured to control the heater; and
an ambient temperature detection unit configured to detect an ambient temperature,
wherein the control unit
performs control in which a condition related to the ambient temperature for starting an operation of the heater differs between a case in which the air-conditioning state is set to the inside air circulation state and a case in which the air-conditioning state is set to the outside air introduction state, and
starts the operation of the heater when a change amount of the ambient temperature per predetermined time is not less than a predetermined threshold, and
the predetermined threshold of the case in which the air-conditioning state is set to the inside air circulation state is smaller than the predetermined threshold in the case in which the air-conditioning state is set to the outside air introduction state.

3. The apparatus according to claim 1, wherein the control unit performs control in which a condition during the operation of the heater differs between the case in which the air-conditioning state is set to the inside air circulation state and the case in which the air-conditioning state is set to the outside air introduction state, and makes an output of the heater during the operation higher in the case in which the air-conditioning state is set to the inside air circulation state than in the case in which the air-conditioning state is set to the outside air introduction state.

4. The apparatus according to claim 1, wherein the control unit performs control in which a condition during the operation of the heater differs between the case in which the air-conditioning state is set to the inside air circulation state and the case in which the air-conditioning state is set to the outside air introduction state, and can make the heater operate intermittently and perform control so that an operation interval of the heater will be shorter in the case in which the air-conditioning state is set to the inside air circulation state than in the case in which the air-conditioning state is set to the outside air introduction state.

5. The apparatus according to claim 1, further comprising:
a bracket configured to support the image capturing unit and the heater,
wherein the bracket includes wall portions,
the wall portions and the transmitting portion delimit a space, and
a communication portion through which air from the air-conditioning unit can be introduced to the space is provided in the wall portion.

* * * * *